(12) United States Patent  (10) Patent No.: US 6,515,243 B2
Ito  (45) Date of Patent: Feb. 4, 2003

(54) TURN SIGNAL SWITCH

(75) Inventor: Hidetaka Ito, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/055,960

(22) Filed: Jan. 28, 2002

(65) Prior Publication Data

US 2002/0100668 A1 Aug. 1, 2002

(30) Foreign Application Priority Data

Jan. 29, 2001 (JP) ......................................... 2001-020458

(51) Int. Cl.⁷ ................................................. H01H 3/16
(52) U.S. Cl. .................. 200/61.3; 200/17 R; 200/61.27
(58) Field of Search ............................ 200/61.3, 61.27, 200/61.34, 61.35, 61.37, 17 R, 18, 4, 332, 335

(56) References Cited

U.S. PATENT DOCUMENTS

| | | | | |
|---|---|---|---|---|
| 4,123,632 A | * | 10/1978 | Muto ........................ | 200/61.27 |
| 5,030,802 A | * | 7/1991 | Noro ......................... | 200/61.27 |
| 5,672,855 A | * | 9/1997 | Uchiyama et al. .......... | 200/61.3 |
| 5,861,594 A | * | 1/1999 | Akimoto et al. ........... | 200/61.54 |
| 5,994,653 A | * | 11/1999 | Poleshuk et al. ........... | 200/61.3 |
| 6,025,565 A | * | 2/2000 | Miyase et al. ............. | 200/61.28 |
| 6,172,311 B1 | * | 1/2001 | Hayashi .................... | 200/61.27 |

FOREIGN PATENT DOCUMENTS

JP  6-127305  5/1994

* cited by examiner

Primary Examiner—Karl D. Easthom
Assistant Examiner—Kyung S. Lee
(74) Attorney, Agent, or Firm—Sughrue Mion, PLLC (57) ABSTRACT

There are provided a cancellation cam 1 having projections (21, 22), an operating member (6), which is rotated by the operation of a turn lever (5) from a central neutral position to a right-operated position and a left-operated position, a rotatable cam member (11), which is movable between an interference position where it can interferes with the projections (21, 22) of the cancellation cam (1) and a stand-by position where it can not interfere with these projections, and a ratchet member (16) which does not transmit a rotational force of the cam member 811) to the operating member 6 when the projection (21, 22) of the cancellation cam (1) revolves in the same direction as a direction indicated by the turn lever (5), and interferes with this cam member, and which transmits the rotational force of the cam member (11) to the operating member (6) to return the operating member (6) to the neutral position when the projection (21, 22) of the cancellation cam (1) revolves in a direction opposite to the direction indicated by the turn lever (5). That surface of each of the projections (21, 22), facing the cam member (11), is formed into a tapering surface (21a, 22a).

4 Claims, 10 Drawing Sheets

STEERING IS ROTATED IN LEFT IMMEDIATELY AFTER LEVER IS OPERATED RIGHT

FIG. 6

PRIOR ART

FIG. 7

PRIOR ART

FIG. 8

PRIOR ART

FIG. 9

STEERING IS ROTATED IN LEFT IMMEDIATELY AFTER LEVER IS OPERATED RIGHT

PRIOR ART

FIG. 10
PRIOR ART

TURN SIGNAL SWITCH

BACKGROUND OF THE INVENTION

This invention relates to a turn signal switch (direction indicator) for indicating the right or left turn of an automobile or the like, and more particularly to a self-cancellation technique for automatically returning a turn lever to a neutral position.

Figure 6:
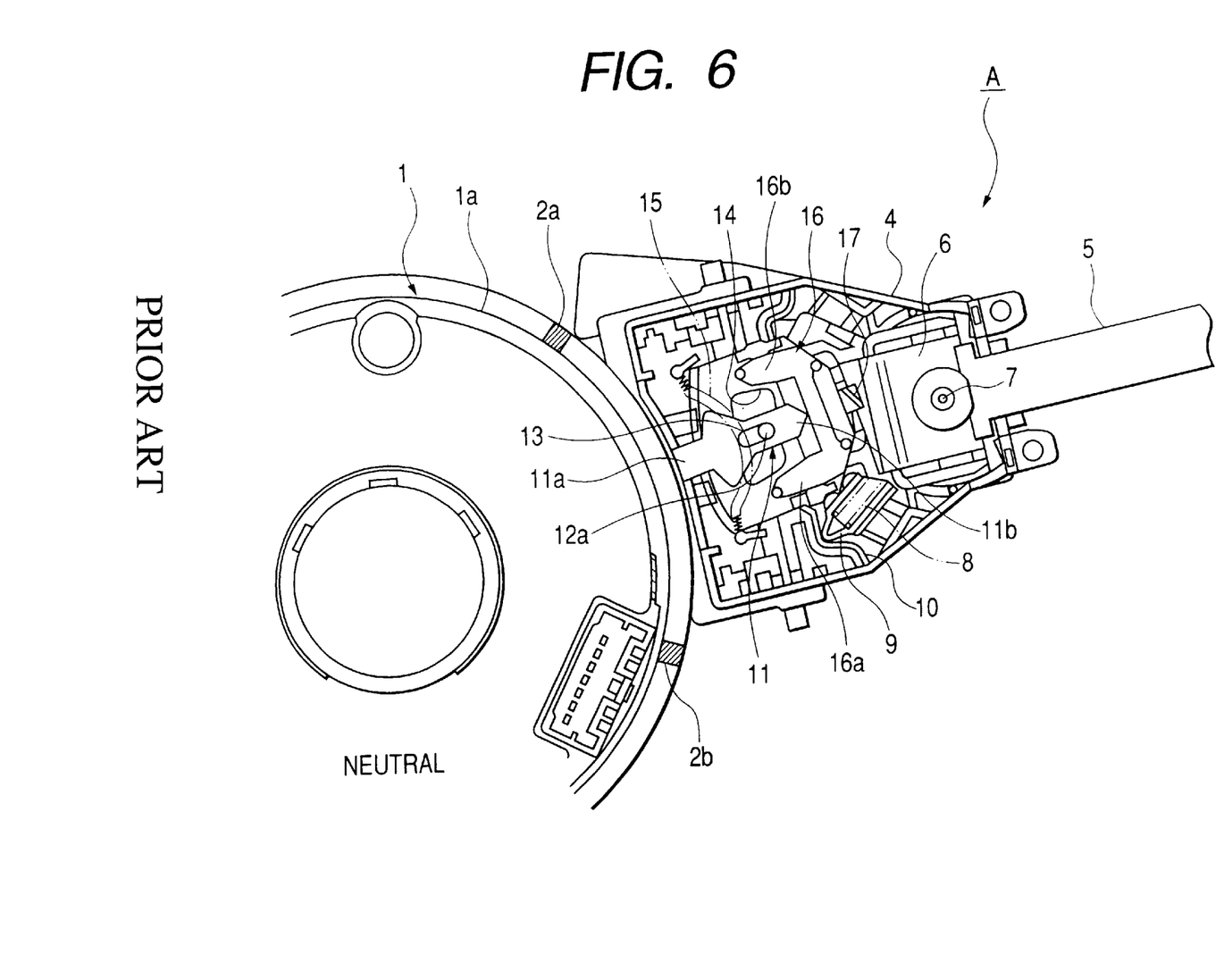
FIG. 6 is a cross-sectional view of a related turn signal switch, showing a condition in which a steering shaft is disposed in a neutral position, and a turn lever is located in a neutral position.
Figure 7:
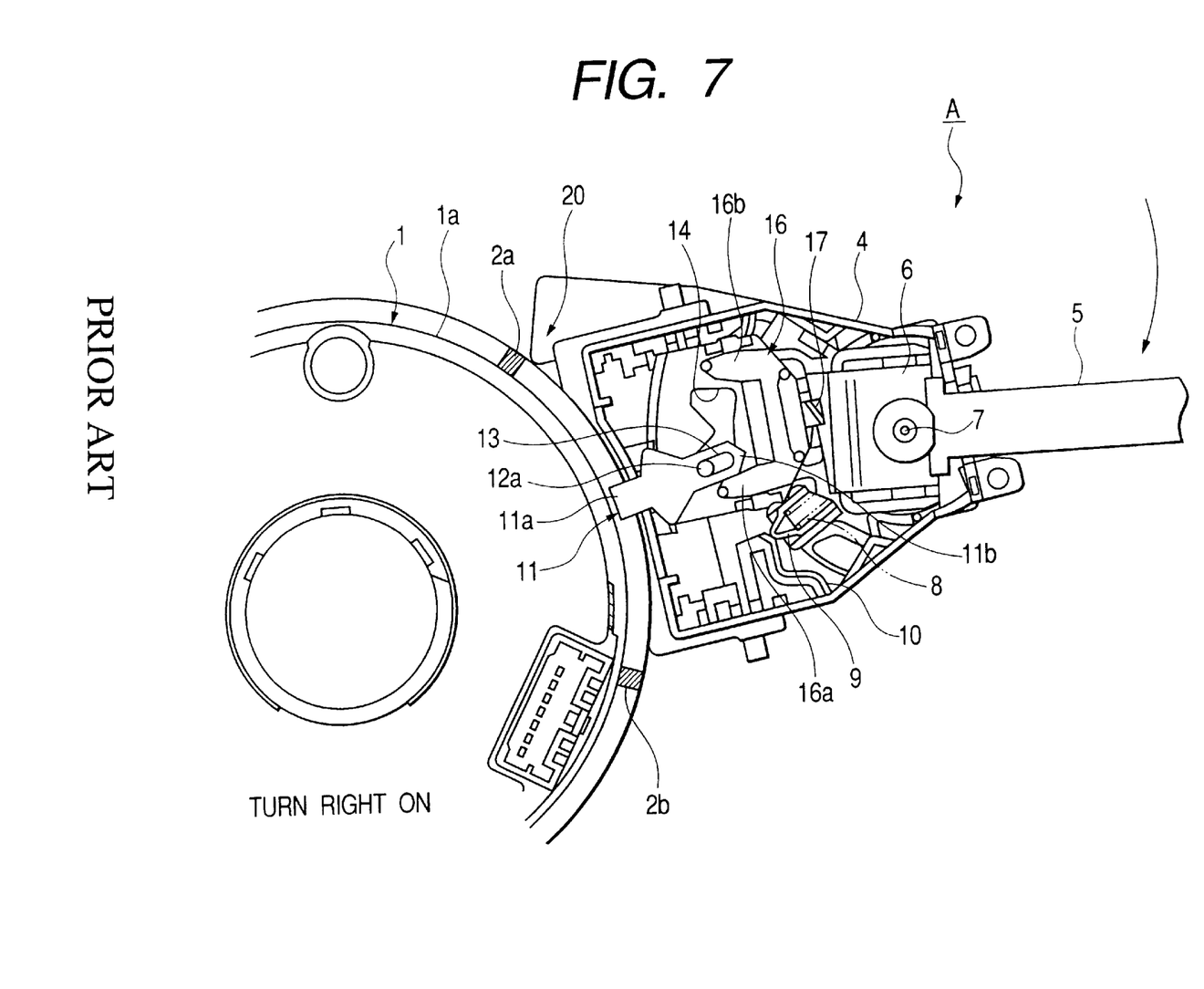
FIG. 7 is a cross-sectional view of the related turn signal switch, showing a condition in which the turn lever is operated to a right position.
Figure 8:
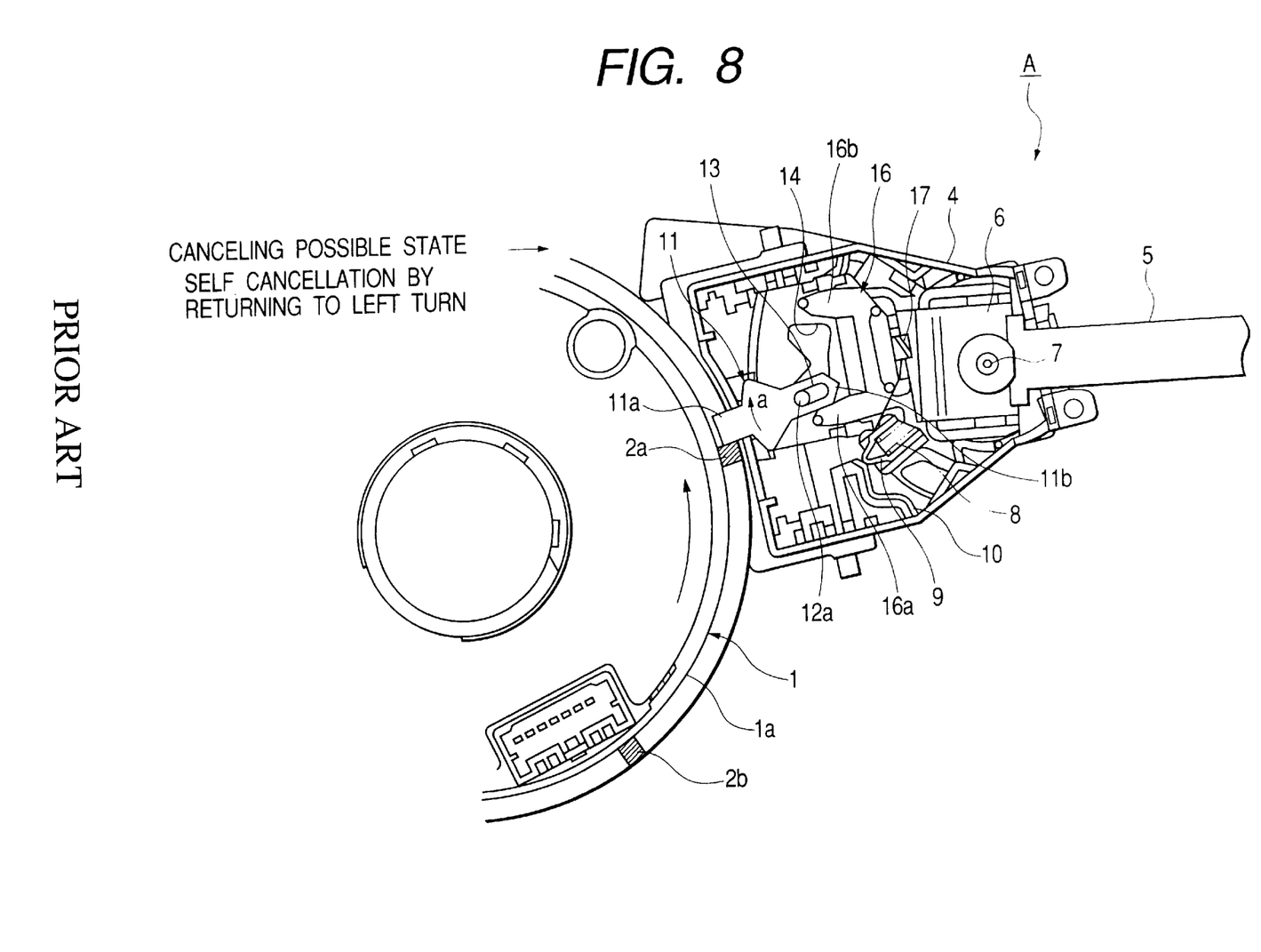
FIG. 8 is a cross-sectional view of the related turn signal switch, showing a condition in which the steering shaft, after rotated right, is rotated left, and a cam member and a projection are disposed in an interference position.
Figure 9:
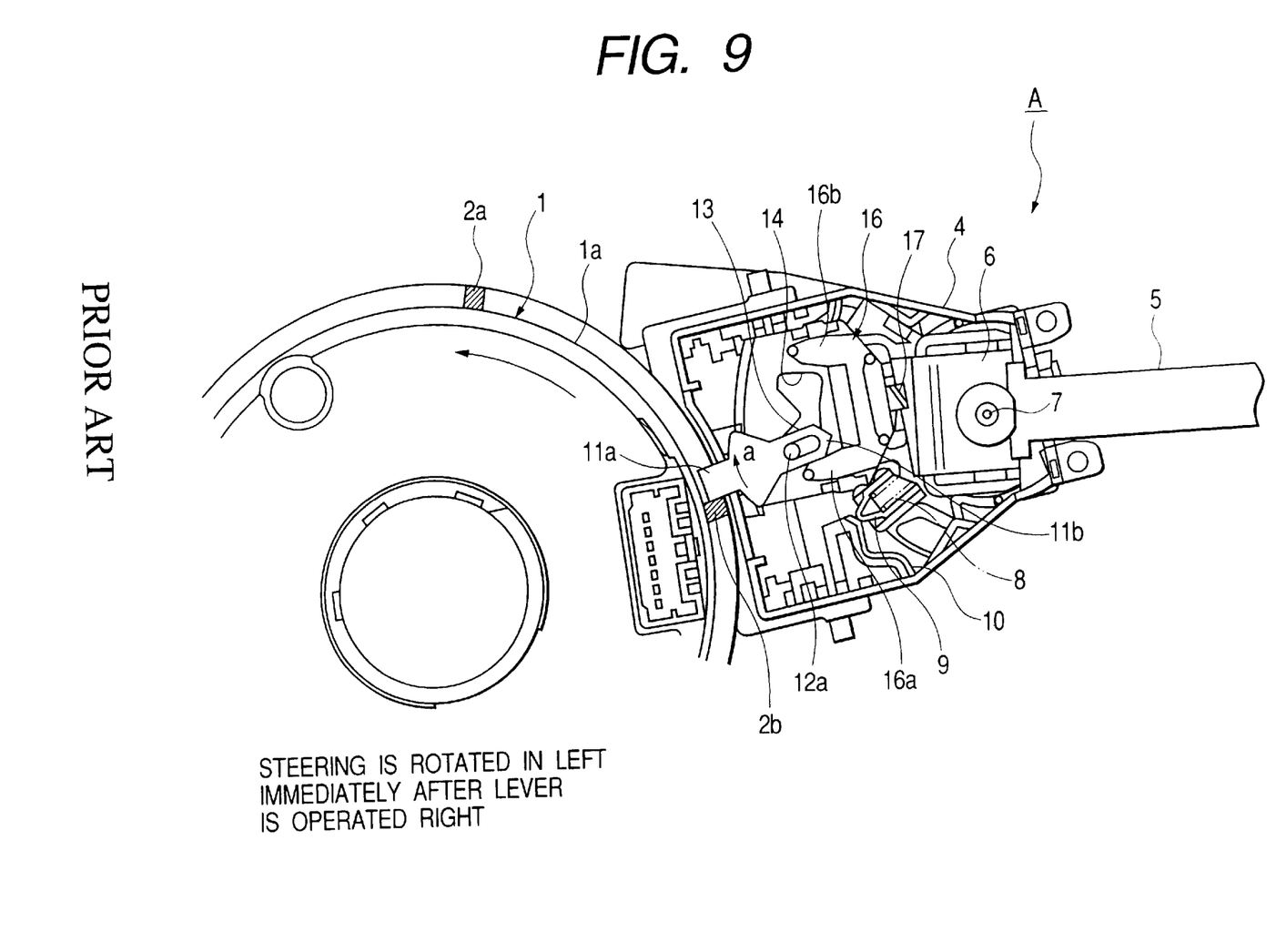
FIG. 9 is a cross-sectional view of the related turn signal switch, showing a condition in which the steering shaft is directly rotated left without being rotated right, and the cam member and a projection are disposed in the interference position.
Figure 10:
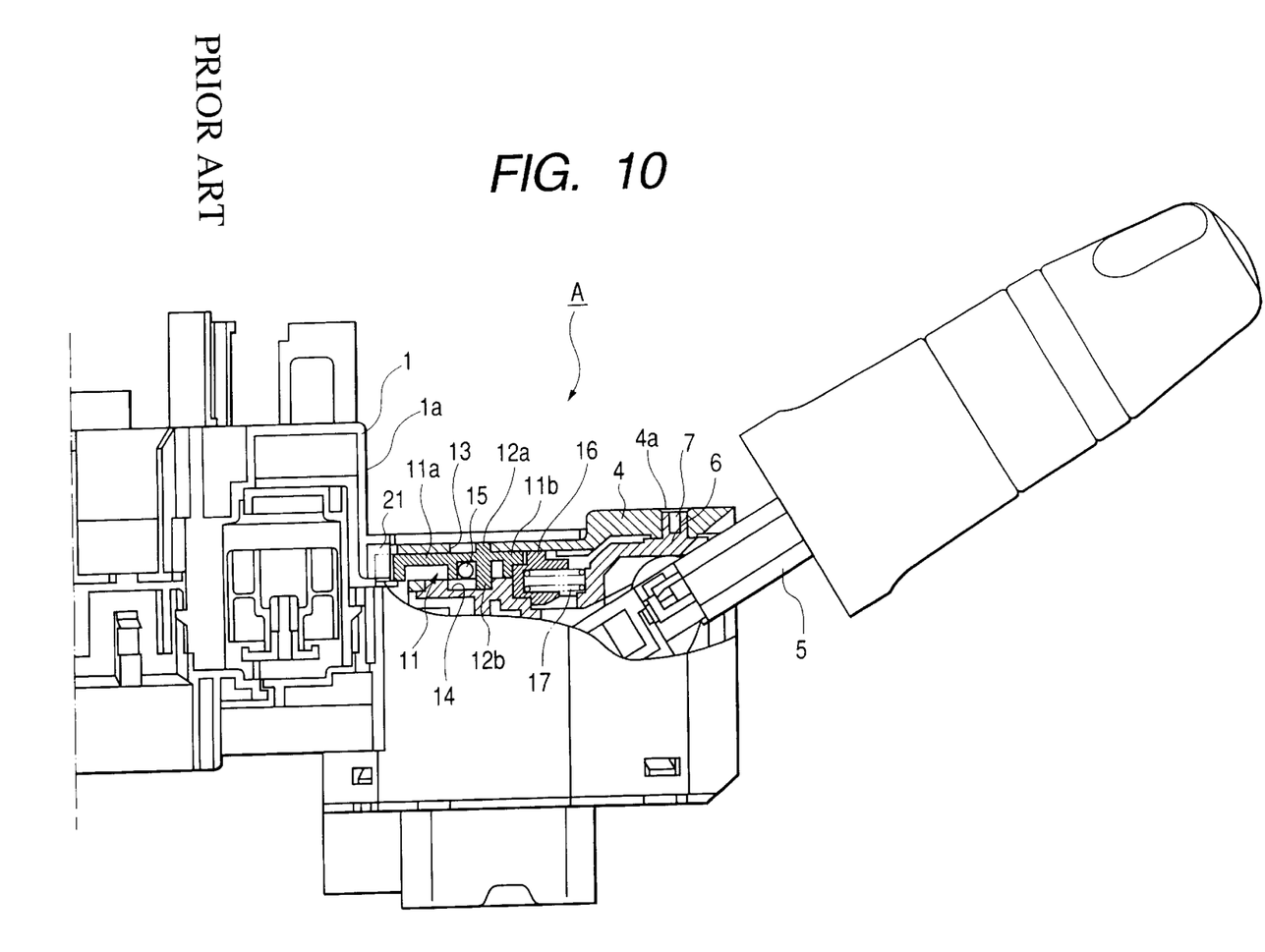
FIG. 10 is a cross-sectional view of the related turn signal switch, showing its cross-section different from that of FIGS. 6 to 9.

A related turn signal switch of this type is shown in FIGS. 6 to 10. FIG. 6 is a cross-sectional view of the turn signal switch, showing a condition in which a steering shaft is disposed in a neutral position, and a turn lever is located in a neutral position, FIG. 7 is a cross-sectional view of the turn signal switch, showing a condition in which the turn lever is operated to a right position, FIG. 8 is a cross-sectional view of the turn signal switch, showing a condition in which the steering shaft, after rotated right, is rotated left, and a cam member and a projection are disposed in an interference position, FIG. 9 is a cross-sectional view of the turn signal switch, showing a condition in which the steering shaft is directly rotated left without being rotated right, and the cam member and a projection are disposed in an interference position, and FIG. 10 is a cross-sectional view of the turn signal switch, showing its cross-section different from that of FIGS. 6 to 9.

As shown in FIGS. 6 to 10, the turn signal switch A includes a cancellation cam 1, and this cancellation cam 1 is so provided as to rotate in accord with the rotation of the steering shaft (not shown). The cancellation cam 1 has a circumferential surface 1a, and the projections 2a and 2b are formed respectively on two portions of this circumferential surface 1a spaced from each other in the circumferential direction. A cover 4 for receiving parts, described below, is fixedly secured to a box-like member (not shown) substantially covering the outer periphery of the cancellation cam 1. The turn lever 5 projects from this cover 4. A base portion of the turn lever 5 is fixedly secured to an operating member 6 received in the cover 4.

This operating member 6 is pivotally mounted on the cover 4 through a rotation support pin 7 inserted in a rotation hole 4a in the cover 4, and with this construction the turn lever 5 is operated to be moved from the central neutral position to the right-turn position and the left-turn position. When the turn lever 5 is in the neutral position, the operating member 6 is located in a neutral position, and when the turn lever 5 is in the right-turn position, the operating member 6 is located in a right-operated position, and when the turn lever 5 is in the left-turn position, the operating member 6 is located in a left-operated position. A position-holding pin 9, on which an urging force of a spring 8 acts, is formed on the operating member 6, and this position-holding pin 9 is abutted against an inclined stepped surface 10 of the cover 4. As the operating member 6 is pivotally moved, the position-holding pin 9 slides over the inclined stepped surface 10, and the operating member 6 is held in the three positions, that is, its neutral position, right-operated position and left-operated position, with a predetermined position-holding force larger than that obtained in the other positions.

The cam member 11 has a pair of support pin portions 12a and 12b, and one of the pair of support pin portions 12a and 12b, that is, the support pin portion 12a, is inserted in a slot 13 in the cover 4 while the other 12b is inserted in a control groove 14 in the operating member 6. A lower surface of the control groove 14 has an inverted V-shape, and a central portion of this lower surface is disposed at a position spaced from the circumferential surface 1a of the cancellation cam 1, and the distance of this lower surface from the circumferential surface 1a of the cancellation cam 1 is decreasing gradually from its central portion toward its opposite sides. When the operating member 6 is located in the neutral position, the other support pin 12b is disposed at an apex surface of the inverted V-shape, and a distal end portion 11a of the cam member 11 is disposed in a stand-by position (position shown in FIG. 6) outside a path of revolution of the projections 2a and 2b of the cancellation cam 1. When the operating member 6 is located in the right-operated position or the left-operated position, the other support pin 12b is disposed at a bottom point of the inverted V-shape, and the distal end portion 11a of the cam member 11 is disposed in the interference position (position shown in FIGS. 7 to 9) in the path of revolution of the projections 2a and 2b of the cancellation cam 1.

Namely, the cam member 11 can be moved between the interference position and the stand-by position through the control groove 14 in the operating member 6, and this cam member is supported for rotation about the pair of support pin portions 12a and 12b. A tension spring 15 (shown in FIGS. 6 and 10), which is retained at its opposite ends on the cover 4, and serves as urging means, is engaged at its central portion with the cam member 11, and the cam member 11 is urged toward the interference position by a spring force of this tension spring 15.

A ratchet member 16 is mounted on the operating member 6 so as to slide generally in the direction of the circumference of the circumferential surface 1a of the cancellation cam 1, and a compression spring 17 and so on are interposed between this ratchet member and the operating member 6. The ratchet member 16 is pivotally moved together with the operating member 6 by a spring force of this compression spring 17 unless a sliding force, larger than a predetermined value, acts on the ratchet member. The ratchet member 16 has right and left arms 16a and 16b, and a rear end portion 11b of the cam member 11 is disposed in an interference position, and is disposed between the right and left arms 16a and 16b.

Next, the operation of the turn signal switch A of the above construction will be described with reference to FIGS. 6 to 8. When the turn lever 5 is disposed in the neutral position as shown in FIG. 6, the support pin portion 12b of the cam member 11 is disposed at the apex portion of the control groove 14, so that the cam member 11 is located in the stand-by position. Therefore, even when the cancellation cam 1 rotates in accord with the rotation of the steering shaft (not shown), the cam member 11 does not interfere with the projections 2a and 2b, and merely the cancellation cam 1 is rotated.

When the turn lever 5 is operated to the right position, with the steering shaft (not shown) held in the neutral condition as shown in FIG. 7, the operating member 6 is located in the right-operated position. As a result, the support pin portion 12b of the cam member 11 is moved from the apex portion of the control groove 14 in the operating member 6 to the bottom point portion thereof by the spring force of the tension spring 15, so that the cam member 11 is located in the interference position. The ratchet member 16 rotates together with the operating member 6, so that one arm 16a thereof is located substantially in contact with the rear end portion 11b of the cam member 11.

Then, when the steering shaft (not shown) is rotated right, the cancellation cam 1 is rotated in the right direction (clockwise direction), and the projection 2a of the cancellation cam 1 interferes with the distal end portion 11a of the cam member 11, so that the cam member 11 is rotated counter clockwise about the pair of support pin portions 12a and 12b so as to allow the revolution of the projection 2a. This rotation of the cam member 11 will not exert a rotational force on the ratchet member 16, and therefore the ratchet member 16 will not return the operating member 6 to the neutral position, and therefore the turn lever 5 is kept in the right position.

Then, when the steering shaft (not shown) is rotated left so as to return the steering as shown in FIG. 8, the cancellation cam 1 is rotated in the left direction (counterclockwise direction indicated by an arrow in FIG. 8), and the projection 2a of the cancellation cam 1 interferes with the distal end portion 11a of the cam member 11, so that the cam member 11 is rotated in a clockwise direction a about the pair of support pin portions 12a and 12b so as to allow the revolution of the projection 2a. This rotation of the cam member 11 exerts a rotational force on the ratchet member 16, and therefore the ratchet member 16 and the operating member 6 are rotated about the rotation support pin 7, and the operating member 6 is returned to the neutral position, so that the turn lever 5 is automatically returned to the neutral position. As a result of rotation of the operating member 6 from the right-operated position to the neutral position, the support pin portion 12b of the cam member 11 is moved from the bottom point portion of the control groove 14 to the apex portion thereof against the spring force of the tension spring 15, so that the cam member 11 is returned to the stand-by position.

When the turn lever 5 is operated left, the turn lever 5 is automatically returned to the neutral position by a similar operation although the direction of rotation is opposite to the above-mentioned direction.

In the above construction, the driver operates the turn lever 5 right or left to activate a right winker or a left winker, and after the car turns right or left, the turn lever 5 is automatically returned to the neutral position without the need for operation of the turn lever 5 by the driver, and therefore this can be conveniently used by the driver.

An analogous technique, related to this turn signal switch, is disclosed in JP-A-6-127305.

Incidentally, in those regions where the road is complicated, or when an automobile, having a large inner wheel difference, turns a curve while running along an outwardly-bulged line, there are cases where the steering is operated to be rotated not right but left immediately after the turn lever 5 is operated right. In such a case, in the above related turn signal switch A, the projection 2b of the cancellation cam 1 interferes with the distal end portion 11a of the cam member 11 as shown in FIG. 9, so that the cam member 11 is rotated in the clockwise direction a about the pair of support pin portions 12a and 12b so as to allow the revolution of the projection 2b. This rotation of the cam member 11 exerts a rotational force on the ratchet member 16, and therefore the ratchet member 16 and the operating member 6 are rotated about the rotation support pin 7, and the operating member 6 is returned to the neutral position, so that the turn lever 5 is automatically returned to the neutral position. Therefore, the driver need to again operate the turn lever 5 to the right, thus inviting a problem that the driver cannot conveniently use it.

SUMMARY OF THE INVENTION

Therefore, this invention has been made in order to solve the above problem, and an object of the invention is to provide a turn signal switch in which even when the steering is rotated in a direction opposite to a direction, indicated by a turn lever, immediately after the turn lever is operated right or left, the turn lever will not be automatically returned to a neutral position, and therefore the driver can conveniently use this switch.

In order to solve the aforesaid object, the invention is characterized by having the following arrangement.

(1) A turn signal switch comprising:
a cancellation cam which is moved in accordance with a rotation of a steering shaft and includes a plurality of projections formed on a peripheral surface thereof;
an operating member which is rotated from a central neutral position to a right-operated position and a left-operated position, and is held in the neutral position, the right-operated position and the left-operated position with a predetermined position-holding force;
a turn lever for rotating the operating member;
a cam member which is movable between an interference position where the cam member projects into a path of revolution of the plurality of projections and a stand-by position disposed outside of the path of revolution, wherein the cam member is disposed in the stand-by position when the operating member is in the neutral position, and is disposed in the interference position when the operating member is in one of the right-operated position and the left-operated position;
a ratchet member which does not displace the operating member when one of the plurality of projections is rotated in a same direction as a direction indicated by the turn lever and interferes with the cam member disposed in the interference position, and displaces the operation member when one of the plurality of projections rotates in a direction opposite to the direction indicated by the turn lever and interferes with the cam member disposed in the interference position; and
a self-cancellation prohibiting mechanism prohibits a movement of the operating member to the neutral position only in a case that the cam member interferes with one of the plurality of projection which is disposed, with respect to the cam member, in the same direction as the direction indicated by the turn lever when the cam member is rotated in the direction opposite to the direction indicated by the turn lever and is in the interference position in a neutral condition of the steering shaft.

In this turn signal switch, when the steering is operated to be rotated in the direction opposite to the direction, indicated by the turn lever, immediately after the turn lever is operated right or left, that projection of the cancellation cam, which is disposed in the same direction as the direction, indicated by the turn lever, relative to the cam member, interferes with the cam member. However, because of the provision of the self-cancellation prohibiting mechanism, this interference will not cause the operating member to be shifted to the neutral position.

(2) The turn signal switch according to (1), wherein the self-cancellation prohibiting mechanism is constituted so that surface of each of the plurality of projections which faces the cam member is formed into a tapering surface whose height from the peripheral surface is increasing gradually in a direction away from the cam member in the neutral condition.

(3) A turn signal switch comprising:
a cancellation cam which is moved in accordance with a rotation of a steering shaft and includes a plurality of projections formed on a peripheral surface thereof;

an operating member which is rotated from a central neutral position to a right-operated position and a left-operated position, and is held in the neutral position, the right-operated position and the left-operated position with a predetermined position-holding force;

a turn lever for rotating the operating member;

a cam member which is movable between an interference position where the cam member projects into a path of revolution of the projections of the cancellation cam and a stand-by position disposed outside of the revolution path, and is urged toward the interference position by an urging force of an urging member, and is rotatably supported, and is disposed in the stand-by position against the urging force of the urging member when the operating member is disposed in the neutral position, and is disposed in the interference position by the urging force of the urging member when the operating member is disposed in the right-operated position and left-operated position; and a ratchet member which does not transmit a rotational force of the cam member to the operating member when one of the plurality of projections is rotated in the same direction as a direction indicated by the turn lever and interferes with the cam member disposed in the interference position for rotating the cam member, and which transmits the rotational force of the cam member to the operating member for returning the operating member to the neutral position when one of the plurality of projection of the cancellation cam is rotated in a direction opposite to the direction indicated by the turn lever, and interferes with the cam member disposed in the interference position for rotating the cam member;

a self-cancellation prohibiting mechanism causes the cam member to be retracted out of the path of revolution of the projection without rotating the cam member only in a case that the cam member interferes with one of the plurality of projection which is disposed, with respect to the cam member, in the same direction as the direction indicated by the turn lever when the cam member is rotated in the direction opposite to the direction indicated by the turn lever and is in the interference position in a neutral condition of the steering shaft.

In this turn signal switch, when the steering is operated to be rotated in the direction opposite to the direction, indicated by the turn lever, immediately after the turn lever is operated right or left, that projection of the cancellation cam, which is disposed in the same direction as the direction, indicated by the turn lever, relative to the cam member, interferes with the cam member. However, this interference cause the cam member to be retracted out of the path of revolution of the projection without rotating the cam member, so that the operating member will not be shifted to the neutral position.

(4) The turn signal switch according to (3), wherein the self-cancellation prohibiting mechanism is constituted so that surface of each of the plurality of projections which faces the cam member is formed into a tapering surface whose height from the peripheral surface is increasing gradually in a direction away from the cam member in the neutral condition.

In this turn signal switch, when that projection of the cancellation cam, which is disposed in the same direction as the direction, indicated by the turn lever, relative to the cam member, interferes with the cam member, the cam member moves over the tapering surface, and is retracted out of the path of revolution of the projection.

DETAILED DESCRIPTION OF PREFERRED EMBODIMENTS

One preferred embodiment of the present invention will now be described with reference to the drawings.

Figure 1:
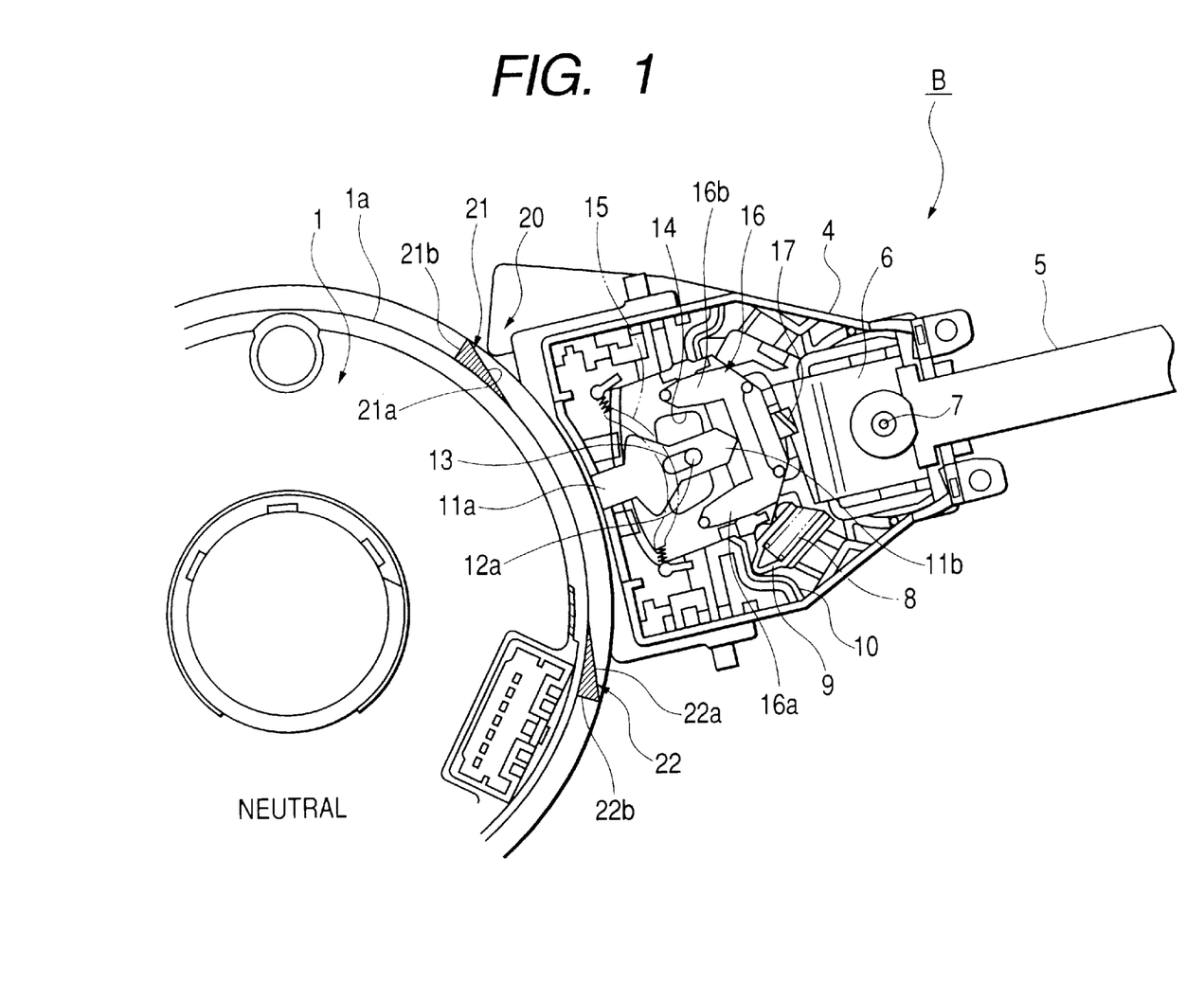
FIG. 1 is a cross-sectional view of one preferred embodiment of a turn signal switch of the present invention, showing a condition in which a steering shaft is disposed in a neutral position, and a turn lever is located in a neutral position.
Figure 2:
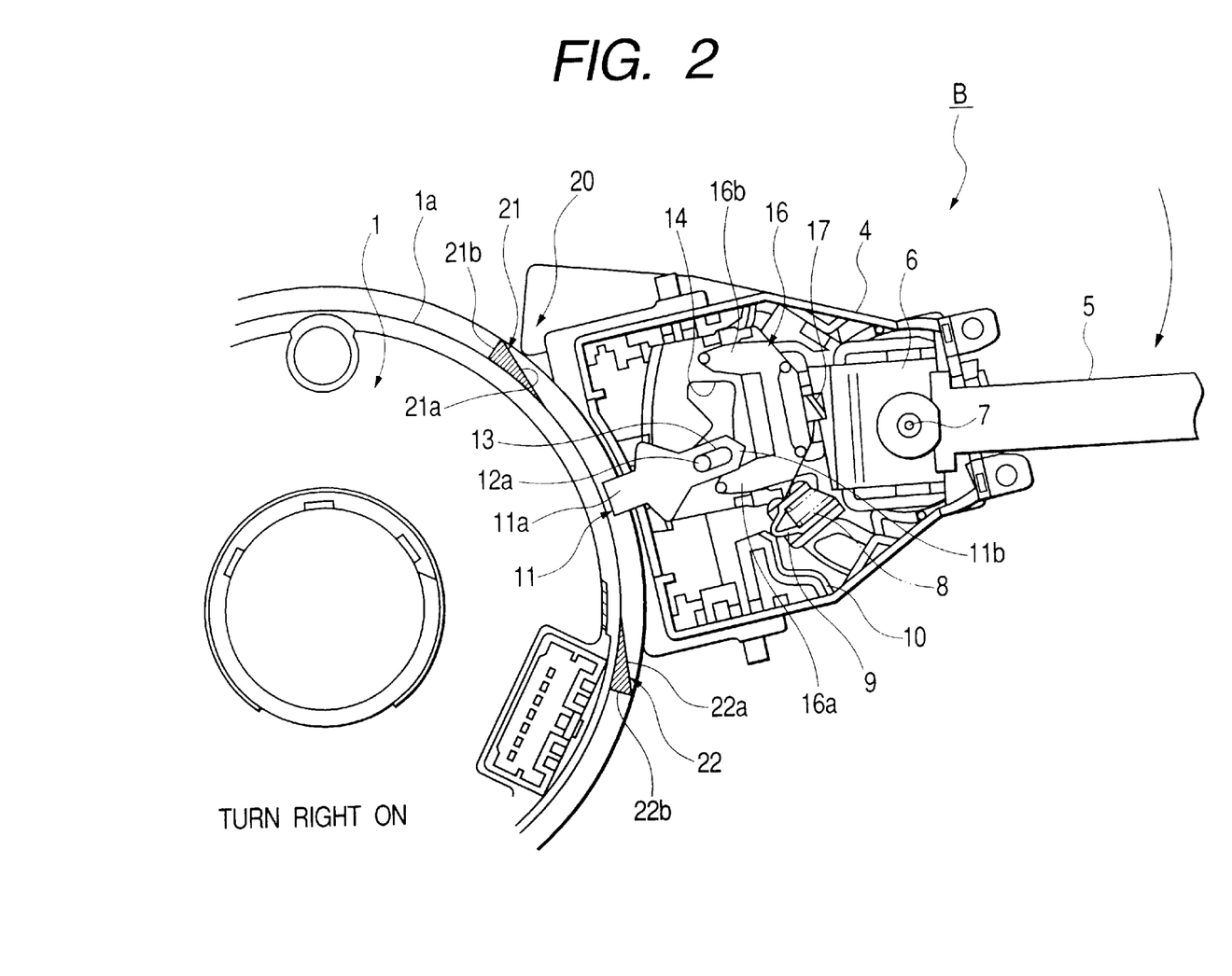
FIG. 2 is a cross-sectional view of the embodiment of the turn signal switch of the invention, showing a condition in which the turn lever is operated to a right position.
Figure 3:
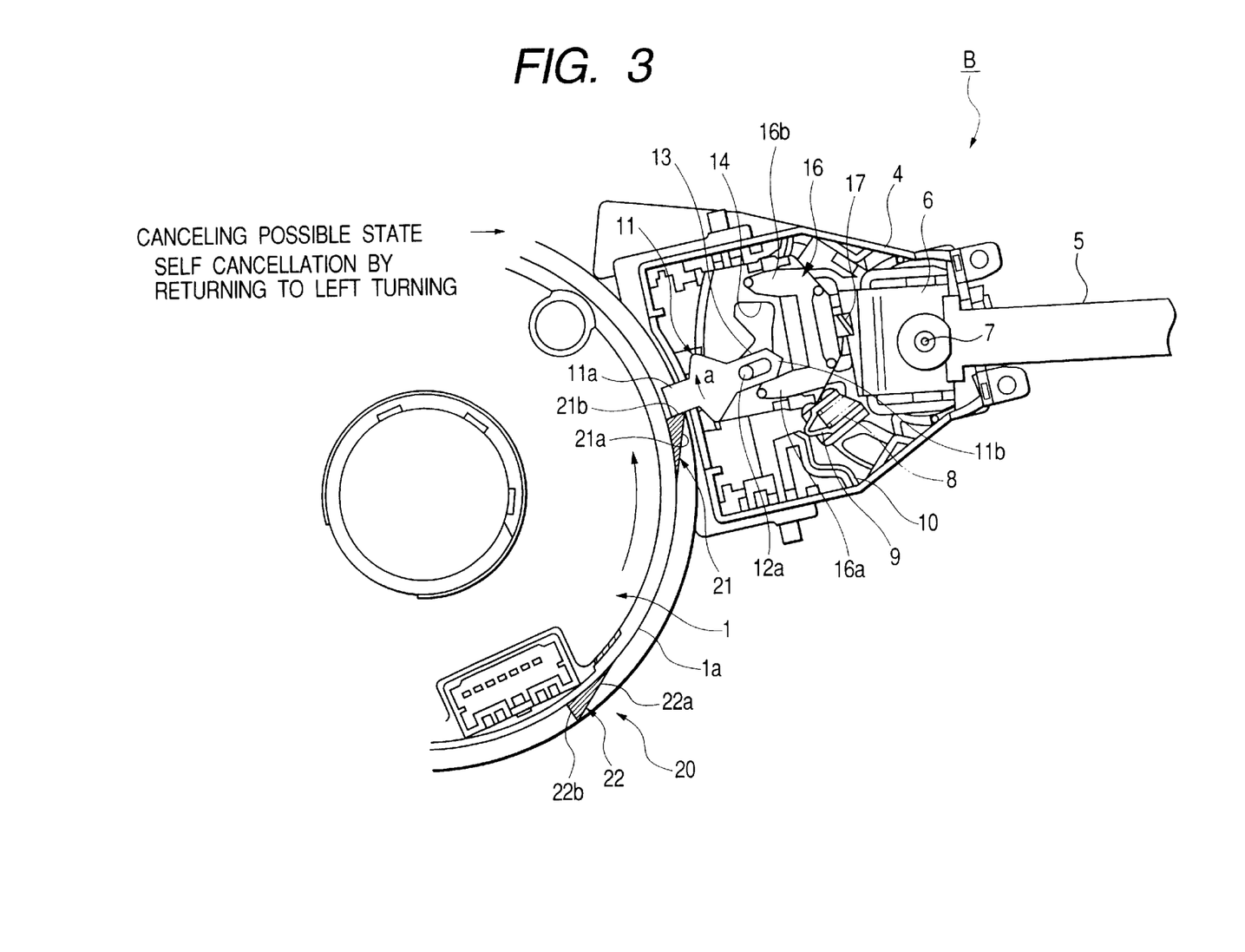
FIG. 3 is a cross-sectional view of the embodiment of the turn signal switch of the invention, showing a condition in which the steering shaft, after rotated right, is rotated left, and a cam member and a projection are disposed in an interference position.
Figure 4:
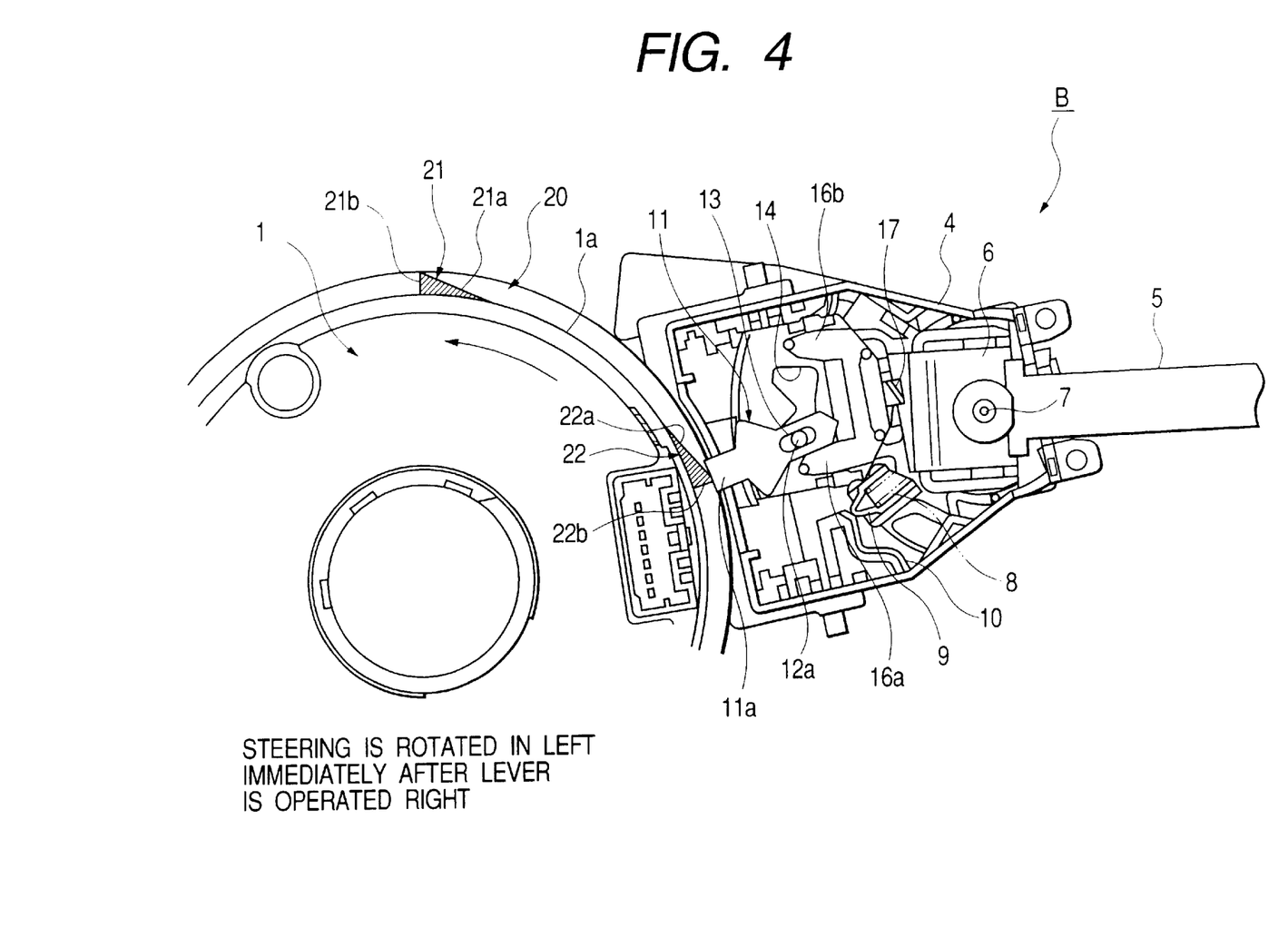
FIG. 4 is a cross-sectional view of the embodiment of the turn signal switch of the invention, showing a condition in which the steering shaft is directly rotated left without being rotated right, and the cam member and a projection are disposed in the interference position.
Figure 5:
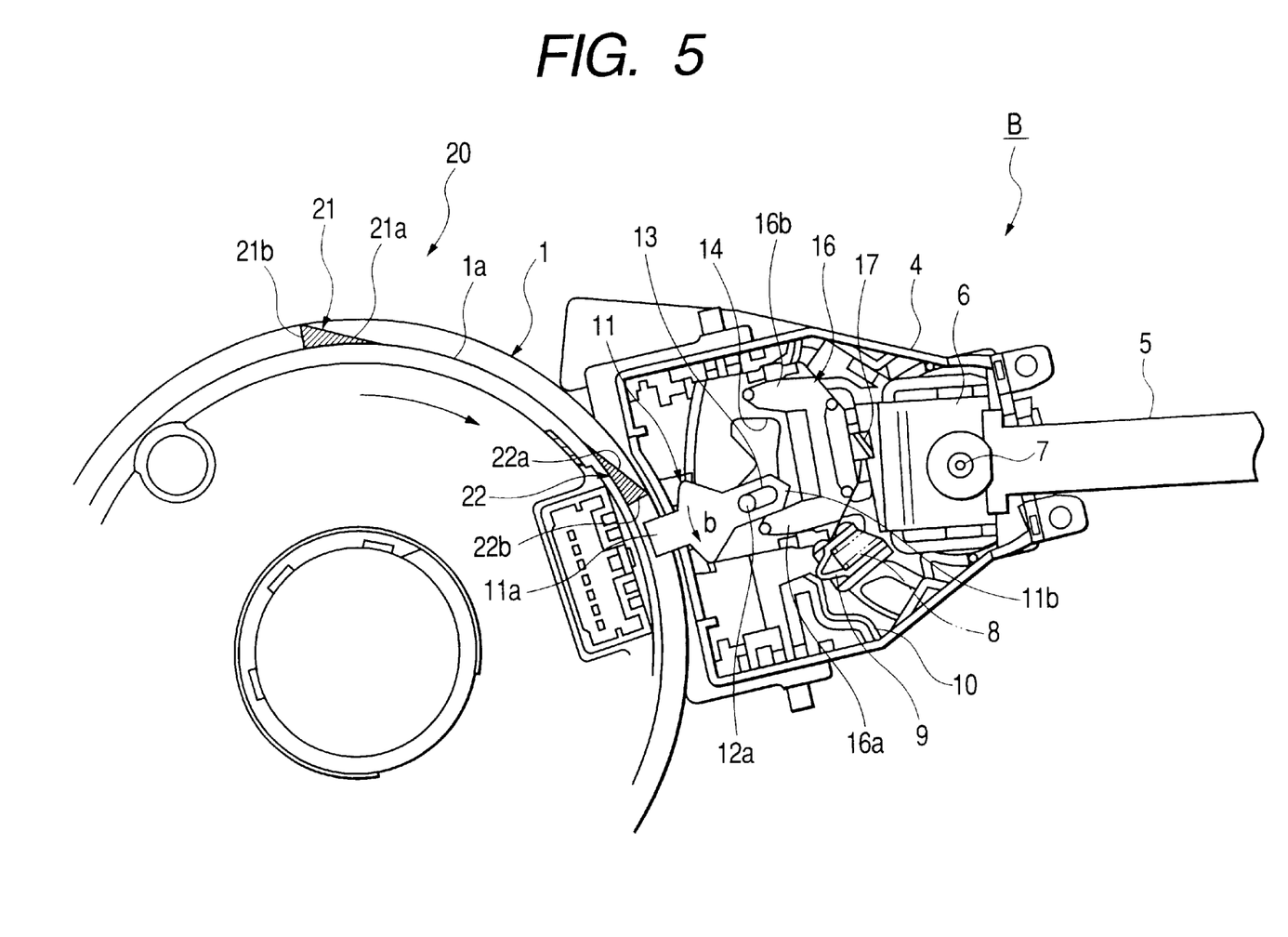
FIG. 5 is a cross-sectional view of the embodiment of the turn signal switch of the invention, showing a condition in which the steering shaft is directly rotated left without being rotated right, and then is rotated right, and the cam member and the projection are disposed immediately before the interference position.

FIGS. 1 to 5 show one preferred embodiment of the present invention, and FIG. 1 is a cross-sectional view of a turn signal switch, showing a condition in which a steering shaft is disposed in a neutral position, and a turn lever is located in a neutral position, FIG. 2 is a cross-sectional view of the turn signal switch, showing a condition in which the turn lever is operated to a right position, FIG. 3 is a cross-sectional view of the turn signal switch, showing a condition in which the steering shaft, after rotated right, is rotated left, and a cam member and a projection are disposed in an interference position, FIG. 4 is a cross-sectional view of the turn signal switch, showing a condition in which the steering shaft is directly rotated left without being rotated right, and the cam member and a projection are disposed in the interference position, and FIG. 5 is a cross-sectional view of the turn signal switch, showing a condition in which the steering shaft is directly rotated left without being rotated right, and then is rotated right, and the cam member and the projection are disposed immediately before the interference position.

In FIGS. 1 to 5, comparing this embodiment with the above related example, identical constituent portions will be designated by identical reference numerals, respectively, and explanation thereof will be omitted, and only different constituent portions will be described.

Namely, the projections 21 and 22 are formed respectively on two portions of a circumferential surface 1a of a cancellation cam 1 spaced from each other in the circumferential direction as in the related example, and those surfaces of the projections 21 and 22, which face the cam member 11 when the steering shaft (not shown) is disposed in the neutral position, and the cam member 11 is located in the interference position, are formed respectively as tapering surfaces 21a and 22a serving as self-cancellation prohibiting mechanism. Each of these tapering surfaces 21a and 22a has such a tapering shape that its height from the peripheral surface is increasing gradually in a direction away from the cam member 11. Those surfaces of the projections 21 and 22, facing away from the cam member 11, are formed respectively into perpendicular surfaces 21b and 22b perpendicular to the circumferential surface 1a. The other construction is the same as that of the related example.

Next, the operation of the turn signal switch B of the above construction will be described with reference to FIGS. 1 to 5. When the turn lever 5 is disposed in the neutral position as shown in FIG. 1, a support pin portion 12b of the cam member 11 is disposed at an apex portion of a control groove 14, so that the cam member 11 is located in a stand-by position. Therefore, even when the cancellation cam 1 rotates in accord with the rotation of the steering shaft (not shown), the cam member 11 does not interfere with the projections 21 and 22, and merely the cancellation cam 1 is rotated.

When the turn lever 5 is operated to the right position, with the steering shaft (not shown) held in the neutral condition as shown in FIG. 2, an operating member 6 is located in a right-operated position. As a result, the support pin portion 12b of the cam member 11 is moved from the apex portion of the control groove 14 in the operating member 6 to a bottom point portion thereof by a spring force of a tension spring 15, so that the cam member 11 is located in the interference position. A ratchet member 16 rotates together with the operating member 6, so that one arm 16a thereof is located substantially in contact with a rear end portion 11b of the cam member 11.

Then, when the steering shaft (not shown) is rotated right, the cancellation cam 1 is rotated in the right direction (clockwise direction), and the projection 21 of the cancellation cam 1 interferes with a distal end portion 11a of the cam member 11, and the cam member 11 slides over the tapering surface 21a of the projection 21, and is shifted to the stand-by position against the spring force of the tension spring 15. This shifting of the cam member 11 to the stand-by position will not exert a rotational force on the ratchet member 16, and therefore the ratchet member 16 will not return the operating member 6 to the neutral position, and therefore the turn lever 5 is kept in the right position.

Then, when the steering shaft (not shown) is rotated left so as to return the steering as shown in FIG. 3, the cancellation cam 1 is rotated in the left direction (counterclockwise direction indicated by an arrow in FIG. 3), and the perpendicular surface 21b of the projection 21 of the cancellation cam 1 interferes with the distal end portion 11a of the cam member 11, so that the cam member 11 is rotated in a clockwise direction a about the pair of support pin portions 12a and 12b so as to allow the revolution of the projection 21. This rotation of the cam member 11 exerts a rotational force on the ratchet member 16, and therefore the ratchet member 16 and the operating member 6 are rotated about a rotation support pin 7, and the operating member 6 is returned to the neutral position, so that the turn lever 5 is automatically returned to the neutral position. As a result of rotation of the operating member 6 from the right-operated position to the neutral position, the support pin portion 12b of the cam member 11 is moved from the bottom point portion of the control groove 14 to the apex portion thereof against the spring force of the tension spring 15, so that the cam member 11 is returned to the stand-by position.

When the turn lever 5 is operated left, the turn lever 5 is automatically returned to the neutral position by a similar operation although the direction of rotation is opposite to the above-mentioned direction.

In the neutral position of the steering shaft (not shown), when the steering is directly operated to be rotated in the left direction (opposite to the direction indicated by the turn lever 5) immediately after the turn lever 5 is operated to the right position as shown in FIG. 2, that projection 22 of the cancellation cam 1, disposed in the same direction as the direction indicated by the turn lever 5, interferes with the cam member 11 as shown in FIG. 4. As a result of this interference, the cam member 11 slides over the tapering surface 22a of the projection 22, and is shifted to the stand-by position against the spring force of the tension spring 5, and thus is retracted out of a path of revolution of the projection 22, and therefore the operating member 6 will not be shifted to the neutral position. Namely, even when the steering is directly rotated in the direction opposite to the direction, indicated by the turn lever 5, immediately after the turn lever 5 is operated right, the turn lever 5 will not be automatically returned to the neutral position, and therefore the driver can conveniently use this switch.

Then, when the steering is rotated right as shown in FIG. 5, the cam member 11 is rotated in a counterclockwise direction b to be retracted out of the revolution path with respect to its interference with the projection 22, and the cam member 11 slides over the tapering surface 21a to be retracted out of the revolution path with respect to its interference with the projection 21, and therefore the operating member 6 will not be shifted to the neutral position. Then, when the steering shaft (not shown) is finally rotated left so as to return the steering as shown in FIG. 3, the cancellation cam 1 is rotated in the left rotational direction (the counterclockwise direction indicated by an arrow in FIG. 3), and the perpendicular surface 21b of the projection 21 of the cancellation cam 1 interferes with the distal end portion 11a of the cam member 11, so that the cam member 11 is rotated in the clockwise direction a about the pair of support pin portions 12a and 12b so as to allow the revolution of the projection 21. This rotation of the cam member 11 exerts a rotational force on the ratchet member 16, and therefore the ratchet member 16 and the operating member 6 are rotated about the rotation support pin 7, and the operating member 6 is returned to the neutral position, so that the turn lever 5 is automatically returned to the neutral position. As a result of rotation of the operating member 6 from the right-operated position to the neutral position, the support pin portion 12b of the cam member 11 is moved from the bottom point portion of the control groove 14 to the apex portion thereof against the spring force of the tension spring 15, so that the cam member 11 is returned to the stand-by position.

When the steering is directly rotated right after the turn lever 5 is operated left, the turn lever 5 will not be automatically returned to the neutral position, but is automatically returned by a similar operation when the steering is finally rotated right, although the direction of rotation is opposite to the above-mentioned direction.

In this embodiment, when that projection 21, 22 of the cancellation cam 1, disposed in the same direction as the direction, indicated by the turn lever 5, relative to the cam member 11, interferes with the cam member 11, the cam member 11 moves over the tapering surface 21a, 22a of this projection 21, 22, and is retracted out of the path of revolution of the projection 21, 22. Therefore, in the related turn signal switch A, the necessary arrangement can be made only by changing the design of the projections 2a and 2b.

In this embodiment, although the self-cancellation prohibiting mechanism 20 is provided by forming the predetermined surfaces of the projections 21 and 22 of the cancellation cam 1 respectively into the tapering surfaces 21a and 22a, the self-cancellation prohibiting mechanism 20 may be of any such type that when the cam member is located in the interference position in the neutral condition of the steering shaft, only the interference of that projection 21, 22 (which is disposed in the same direction as the direction, indicated by the turn lever 5, relative to the cam member 11) with the cam member 11 upon rotation of this projection 21, 22 in the direction opposite to the direction, indicated by the turn lever 5, does not cause the operating member 6 to be shifted to the neutral position. Examples of specific means for not shifting the operating member 6 to the neutral position include the means of the above embodiment and means by which when that projection 21, 22, which is disposed in the same direction as the direction, indicated by the turn lever 5, relative to the cam member 11, interferes with the cam member 11 upon rotation in the direction opposite to the direction, indicated by the turn lever 5, the cam member 11 is retracted out of the path of revolution of the projection 21, 22 without being rotated.

As described above, according to the invention, there is provided the turn signal switch comprising the cancellation cam, having the plurality of projections formed on the peripheral surface thereof; the operating member which is rotated by the operation of the turn lever from the central neutral position to the right-operated position and the left-operated position;

the cam member which is movable between the interference position where the cam member projects into the path of revolution of the projections of the cancellation cam and the stand-by position disposed outside of the revolution path, and is disposed in the stand-by position when the operating member is disposed in the neutral position, and is disposed in the interference position when the operating member is disposed in the right-operated position and left-operated position; and the ratchet member which does not cause the operating member to be shifted in position when the projection of the cancellation cam revolves in the same direction as the direction indicated by the turn lever, and interferes with the cam member disposed in the interference position, and which causes the operating member to be shifted to the neutral position when the projection of the cancellation cam revolves in the direction opposite to the direction indicated by the turn lever, and interferes with the cam member disposed in the interference position; wherein there is provided the self-cancellation prohibiting mechanism by which when the cam member is located in the interference position in the neutral condition of the steering shaft, only the interference of the projection (which is disposed in the same direction as the direction, indicated by the turn lever, relative to the cam member) with the cam member upon rotation of the projection in the direction opposite to the direction, indicated by the turn lever, does not cause the operating member to be shifted to the neutral position. Therefore, when the steering is operated to be rotated in the direction opposite to the direction, indicated by the turn lever, immediately after the turn lever is operated right or left, that projection of the cancellation cam, which is disposed in the same direction as the direction, indicated by the turn lever, relative to the cam member, interferes with the cam member. However, because of the provision of the self-cancellation prohibiting mechanism, this interference will not cause the operating member to be shifted to the neutral position. Therefore, even when the steering is rotated in the direction opposite to the direction, indicated by the turn lever, immediately after the turn lever is operated right or left, the turn lever will not be automatically returned to the neutral position, and this can be conveniently used by the driver.

According to the invention, there is provided the turn signal switch comprising the cancellation cam, having the plurality of projections formed on the peripheral surface thereof; the operating member which is rotated by the operation of the turn lever from the central neutral position to the right-operated position and the left-operated position; the cam member which is movable between the interference position where the cam member projects into the path of revolution of the projections of the cancellation cam and the stand-by position disposed outside of the revolution path, and is urged toward the interference position by the urging force of the urging means, and is rotatably supported, and is disposed in the stand-by position against the urging force of the urging means when the operating member is disposed in the neutral position, and is disposed in the interference position by the urging force of the urging means when the operating member is disposed in the right-operated position and left-operated position; and the ratchet member which does not transmit the rotational force of the cam member to the operating member when the projection of the cancellation cam revolves in the same direction as the direction indicated by the turn lever, and interferes with the cam member, disposed in the interference position, to rotate the same, and which transmits the rotational force of the cam member to the operating member to return the operating member to the neutral position when the projection of the cancellation cam revolves in the direction opposite to the direction indicated by the turn lever, and interferes with the cam member, disposed in the interference position, to rotate the same; wherein there is provided the self-cancellation prohibiting mechanism by which when the cam member is located in the interference position in the neutral condition of the steering shaft, the interference of the projection (which is disposed in the same direction as the direction, indicated by the turn lever, relative to the cam member) with the cam member upon rotation of the projection in the direction opposite to the direction, indicated by the turn lever, causes the cam member to be retracted out of the path of revolution of the projection without rotating the cam member. Therefore, when the steering is operated to be rotated in the direction opposite to the direction, indicated by the turn lever, immediately after the turn lever is operated right or left, that projection of the cancellation cam, which is disposed in the same direction as the direction, indicated by the turn lever, relative to the cam member, interferes with the cam member. However, this interference causes the cam member to be retracted out of the path of revolution of the projection without rotating the cam member, so that the operating member will not be shifted to the neutral position. Therefore, even when the steering is rotated in the direction opposite to the direction, indicated by the turn lever, immediately after the turn lever is operated right or left, the turn lever will not be automatically returned to the neutral position, and this can be conveniently used by the driver.

According to the invention, the self-cancellation prohibiting mechanism is formed by that surface of each of the projections which faces the cam member when the steering shaft is disposed in the neutral position, and the cam member is located in the interference position, and this surface is formed into the tapering surface whose height from the peripheral surface is increasing gradually in the direction away from the cam member. Therefore, when that projection of the cancellation cam, which is disposed in the same direction as the direction, indicated by the turn lever, relative to the cam member, interferes with the cam member, the cam member moves over the tapering surface, and is retracted out of the path of revolution of the projection. Therefore, in the related turn signal switch, the necessary arrangement can be made only by changing the design of the projections of the cancellation cam.

What is claimed is:

1. A turn signal switch comprising:

a cancellation cam which is moved in accordance with a rotation of a steering shaft and includes a plurality of projections formed on a peripheral surface thereof;

an operating member which is rotated from a central neutral position to a right-operated position and a left-operated position, and is held in the neutral position, the right-operated position and the left-operated position with a predetermined position-holding force;

a turn lever for rotating the operating member;

a cam member which is movable between an interference position where the cam member projects into a path of revolution of the plurality of projections and a stand-by position disposed outside of the path of revolution, wherein the cam member is disposed in the stand-by position when the operating member is in the neutral position, and is disposed in the interference position when the operating member is in one of the right-operated position and the left-operated position;

a ratchet member which does not displace the operating member when one of the plurality of projections is rotated in a same direction as a direction indicated by the turn lever and interferes with the cam member disposed in the interference position, and displaces the operation member when one of the plurality of projections rotates in a direction opposite to the direction indicated by the turn lever and interferes with the cam member disposed in the interference position; and a self-cancellation prohibiting mechanism prohibits a movement of the operating member to the neutral position only in a case that the cam member interferes with one of the plurality of projection which is disposed, with respect to the cam member, in the same direction as the direction indicated by the turn lever when the cam member is rotated in the direction opposite to the direction indicated by the turn lever and is in the interference position in a neutral condition of the steering shaft.

2. The turn signal switch according to claim 1, wherein the self-cancellation prohibiting mechanism is constituted so that surface of each of the plurality of projections which faces the cam member is formed into a tapering surface whose height from the peripheral surface is increasing gradually in a direction away from the cam member in the neutral condition.

3. A turn signal switch comprising:

a cancellation cam which is moved in accordance with a rotation of a steering shaft and includes a plurality of projections formed on a peripheral surface thereof;

an operating member which is rotated from a central neutral position to a right-operated position and a left-operated position, and is held in the neutral position, the right-operated position and the left-operated position with a predetermined position-holding force;

a turn lever for rotating the operating member;

a cam member which is movable between an interference position where the cam member projects into a path of revolution of the projections of the cancellation cam and a stand-by position disposed outside of the revolution path, is urged toward the interference position by urging force of an urging member, and is rotatably supported, wherein the cam member is disposed in the stand-by position against the urging force of the urging member when the operating member is disposed in the neutral position, and is disposed in the interference position by the urging force of the urging member when the operating member is disposed in the right-operated position and left-operated position; and a ratchet member which does not transmit a rotational force of the cam member to the operating member when one of the plurality of projections is rotated in the same direction as a direction indicated by the turn lever and interferes with the cam member disposed in the interference position for rotating the cam member, and which transmits the rotational force of the cam member to the operating member for returning the operating member to the neutral position when one of the plurality of projection of the cancellation cam is rotated in a direction opposite to the direction indicated by the turn lever, and interferes with the cam member disposed in the interference position for rotating the cam member;

a self-cancellation prohibiting mechanism causes the cam member to be retracted out of the path of revolution of the projection without rotating the cam member only in a case that the cam member interferes with one of the plurality of projection which is disposed, with respect to the cam member, in the same direction as the direction indicated by the turn lever when the cam member is rotated in the direction opposite to the direction indicated by the turn lever and is in the interference position in a neutral condition of the steering shaft.

4. The turn signal switch according to claim 3, wherein the self-cancellation prohibiting mechanism is constituted so that surface of each of the plurality of projections which faces the cam member is formed into a tapering surface whose height from the peripheral surface is increasing gradually in a direction away from the cam member in the neutral condition.

* * * * *